United States Patent
Stallings

[19]

[11] Patent Number: 5,816,136
[45] Date of Patent: Oct. 6, 1998

[54] AUTOMATIC STIRRER FOR USE WITH POTS OF DIFFERENT SIZES

[76] Inventor: Patricia B. Stallings, Rte. #1, Box 274-A, Pinetops, N.C. 27864

[21] Appl. No.: 929,050

[22] Filed: Sep. 15, 1997

[51] Int. Cl.$^6$ .............................. A47J 27/00; A47J 36/32; B01F 7/16; B01F 7/20
[52] U.S. Cl. .............................. 99/335; 99/348; 366/251; 366/282; 366/312
[58] Field of Search .............................. 99/331, 335, 348, 99/353, 423; 366/242–254, 279, 282, 285, 312, 255–260, 342, 343, 607

[56] References Cited

U.S. PATENT DOCUMENTS

| | | | |
|---|---|---|---|
| D. 316,100 | 4/1991 | Kief ........................................ D15/19 |
| D. 341,291 | 11/1993 | Dow, III .................................. D7/376 |
| 3,810,605 | 5/1974 | Lambert ................................ 99/348 X |
| 4,151,792 | 5/1979 | Nearhood ............................ 366/251 X |
| 4,339,992 | 7/1982 | Kurland .............................. 366/343 X |
| 4,576,089 | 3/1986 | Chauvin .............................. 366/146 X |
| 4,856,910 | 8/1989 | Cuschera ............................ 366/251 X |
| 5,013,158 | 5/1991 | Tarlow ................................. 99/348 X |
| 5,193,441 | 3/1993 | Hayashi .................................. 99/348 |
| 5,201,263 | 4/1993 | Teng ........................................ 99/335 |
| 5,228,381 | 7/1993 | Virgilio et al. ........................... 99/331 |
| 5,261,745 | 11/1993 | Watkins ................................. 366/250 |
| 5,332,310 | 7/1994 | Wells ..................................... 366/129 |
| 5,372,422 | 12/1994 | Dubroy ................................ 99/348 X |
| 5,516,208 | 5/1996 | Givant ................................... 366/251 |
| 5,613,425 | 3/1997 | Krznaric ................................... 99/348 |
| 5,711,602 | 1/1998 | Rohring et al. ........................ 366/251 |

*Primary Examiner*—Timothy F. Simone
*Attorney, Agent, or Firm*—David L. Volk

[57] ABSTRACT

A lid is adjustable for fitting over various sized pots. Fastening structure is provided for attaching the lid to the pot. A motor is configured to attach to the lid. A stirring apparatus is adapted to be disposed within the pot when the lid is attached to the pot. A drive mechanism is attached to the motor and to the stirring apparatus, and is configured to rotate the stirring apparatus. The lid includes a substantially disk shaped central support structure which supports the motor. An aperture within the support structure is configured for the drive mechanism to extend there-through. A series of overlapping leafs are disposed annularly about the support structure and are hingedly connected thereto. The drive mechanism includes a drive shaft attached to the motor, and a nested structure which comprises an elongated sleeve and an elongated piston which is slidable within the sleeve. The nested structure includes structure to restrict the piston from rotating relative to the sleeve. The stirring apparatus is connectable to a first end of the nested structure, and a second end of the nested structure is connectable to the drive shaft. The stirring apparatus includes a plurality of generally paddle shaped structures which are radially adjustable with respect to an axis of rotation of the drive mechanism. A timer is configured to control the motor to rotate the stirring apparatus constantly and intermittently for a pre-determined period of time.

6 Claims, 5 Drawing Sheets

AUTOMATIC STIRRER FOR USE WITH POTS OF DIFFERENT SIZES

BACKGROUND OF THE INVENTION

1. Field of the Invention

The present invention relates to food preparation apparatus, particularly to devices for stirring food within a pot.

2. Description of the Related Art

A device which will automatically stir food within a pot is a great convenience when preparing a meal, because it permits a person to attend to other matters while the food is being stirred. Automatic food stirrers of the prior art do not include various timed stirring functions which would be helpful. For example, it would be advantageous to set a device to automatically stir food within a pot constantly for a pre-determined period of time. It may also be advantageous to set the device to stir intermittently for a pre-determined period of time.

Automatic food stirrers of the prior art are not adjustable for use with various size pots. Generally, the food stirrer and the pot are available as one unit, made specifically to fit together. It would be advantageous to have a stirrer which could be applied to pots of various sizes. If a person has a need to automatically stir food within various sized pots, such a stirrer would provide a cost savings, because it would not be necessary to buy various sized stirrers in combination with various sized pots.

SUMMARY OF THE INVENTION

The apparatus of the present invention includes a lid which is adjustable for fitting over various sized pots. Fastening structure is provided for attaching the lid to the pot. A motor is configured to attach to the lid. A stirring apparatus is adapted to be disposed within the pot when the lid is attached to the pot. A drive mechanism is attached to the motor and to the stirring apparatus, and is configured to rotate the stirring apparatus.

The lid includes a substantially disk shaped central support structure which supports the motor. An aperture within the support structure is configured for the drive mechanism to extend there-through. A series of overlapping leafs are disposed annularly about the support structure and are hingedly connected thereto.

The drive mechanism includes a drive shaft attached to the motor, and a nested structure which comprises an elongated sleeve and an elongated piston which is slidable within the sleeve. The nested structure includes structure to restrict the piston from rotating relative to the sleeve.

The stirring apparatus is connectable to a first end of the nested structure, and a second end of the nested structure is connectable to the drive shaft. The stirring apparatus includes a plurality of generally paddle shaped structures which are radially adjustable with respect to an axis of rotation of the drive mechanism. A timer is configured to control the motor to rotate the stirring apparatus constantly and intermittently for a pre-determined period of time. This period of time may be adjustable by the user.

Because the lid, the drive mechanism and the stirring apparatus are adjustable, the apparatus may be used with various sized pots.

Because a timer is provided to control the motor to rotate the stirring apparatus both constantly and intermittently for a pre-determined period of time, the user is free to attend to other manners without having to monitor, start and stop the apparatus a number of times.

Still further features and advantages will become apparent from the ensuing description and drawings.

DETAILED DESCRIPTION

Figure 1:
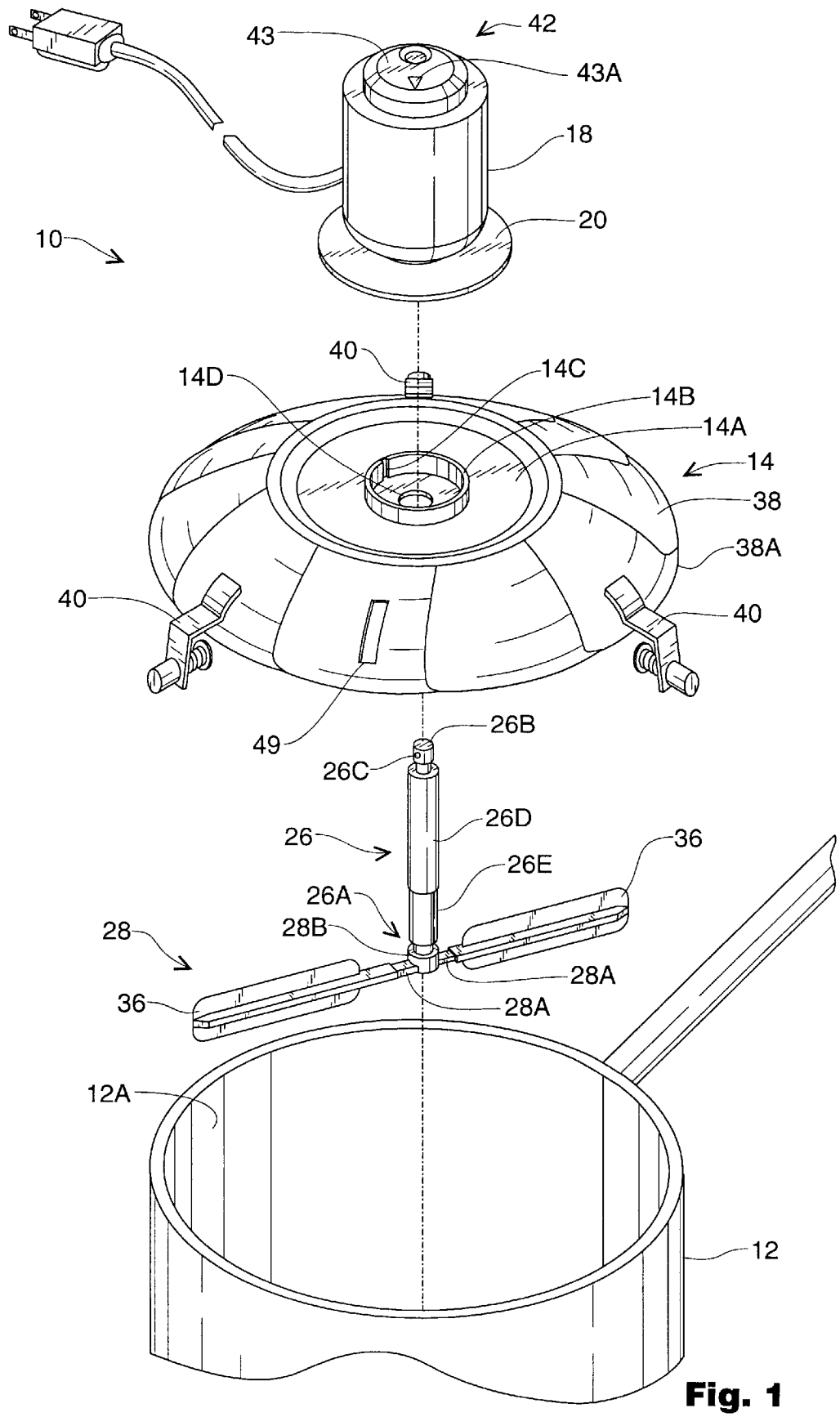
FIG. 1 is an exploded perspective view of the apparatus of the present invention, in use with a pot.
Figure 1A:
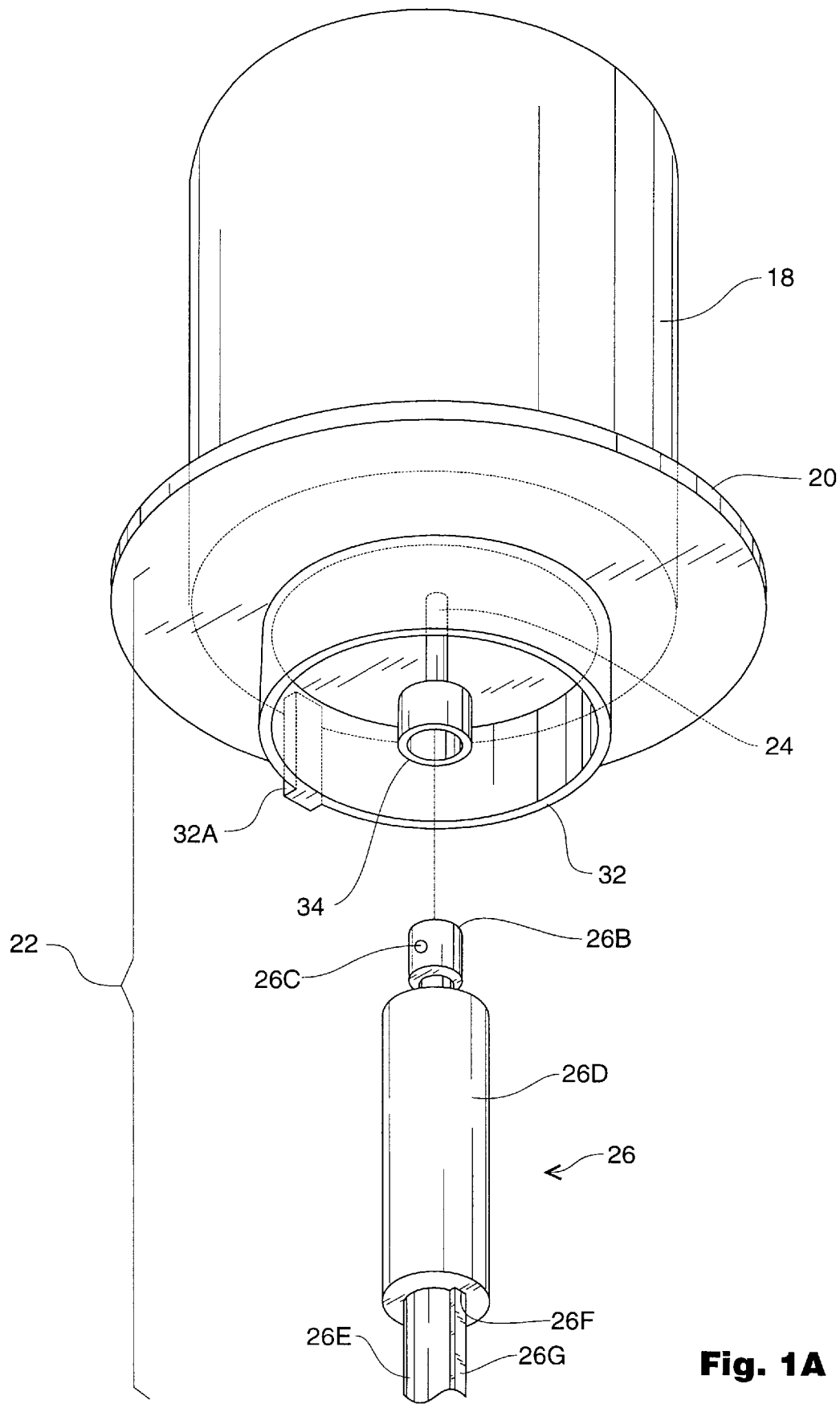
FIG. 1A is a partial exploded perspective view of the apparatus, shown from a different viewpoint.
Figure 2:
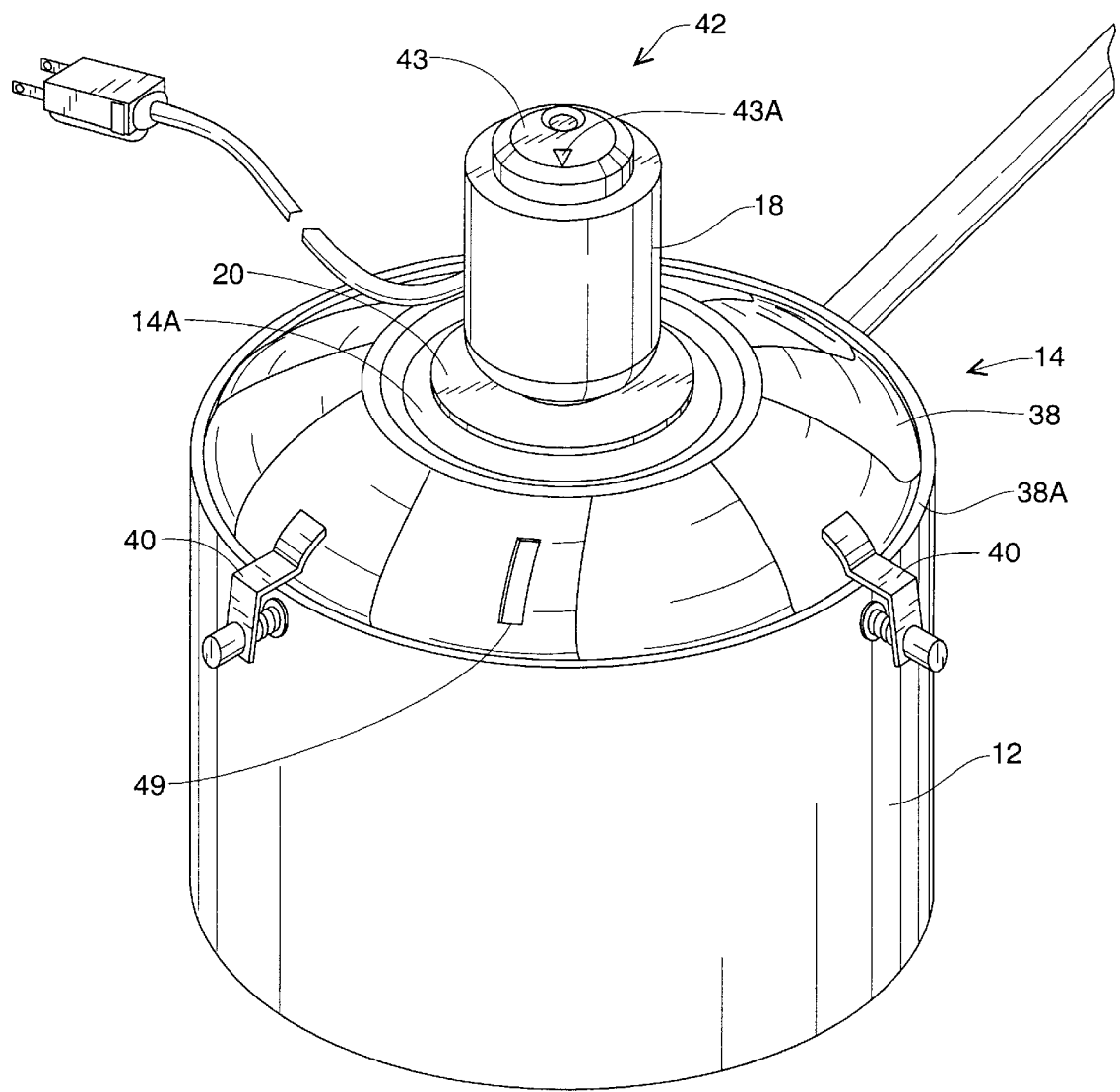
FIG. 2 is a perspective view of the apparatus, shown assembled and affixed to the pot.

FIG. 1 is an exploded perspective view of the apparatus 10 of the present invention, in use with a pot 12. FIG. 1A is a partial exploded perspective view thereof, shown from a different viewpoint. FIG. 2 is a perspective view of the apparatus 10, shown assembled and affixed to the pot 12. Referring to FIGS. 1–2, the apparatus 10 of the present invention includes a lid 14 which is adjustable for fitting over various sized pots 12. A motor 18 includes a base 20, and is configured to attach to a top surface of the lid 14.

A drive means 22 includes a drive shaft 24 connected to the motor 18, and a nested structure 26. A stirring means 28 is connectable to a first end 26A of the nested structure 26, and a second end 26B is connectable to the drive shaft 24. The motor 18 and the drive means 22 in combination are configured to rotate the stirring means 28.

The lid 14 includes a substantially disk shaped central support structure 14A which supports the base 20 of the motor 18. The underside of the base 20 includes a keyed sleeve 32 which fits within a ring 14B attached to the support structure 14A. A key 32A on the keyed sleeve 32 fits within a channel 14C within the ring 14B.

The drive shaft 24 is connected to a receiving member 34, which is configured to receive the second end 26B of the nested structure 26. The second end 26B is formed to conformingly fit within the receiving member 34, and is retained within the receiving member 34 via a conventional detent mechanism 26C or other suitable structure. The drive means 22 extends through an aperture 14D in the support structure 14A.

The nested structure 26 includes an elongated sleeve 26D and an elongated piston 26E which is slidable within the sleeve 26D. The sleeve 26D includes a notch 26F, and the piston 26E includes a raised ridge 26G configured to conformingly fit within the notch 26F. This structure restricts the piston 26E from rotating within the sleeve 26D, while permitting the piston 26E to slide within the sleeve 26D; thus, the drive means 22 is vertically adjustable to permit the apparatus 10 to be used with pots 12 of varying depths.

The stirring means 28 includes two elongate members 28A which extend radially outward from a central member 28B. The central member 28A is removably connectable in a known manner to the first end 26A of the nested structure 26. Two generally paddle shaped structures 36 are each sleevingly receivable on the elongate members 28A. The paddle shaped structures 36 are slidable along the elongate members 28A, thus providing horizontal adjustability which permits the apparatus 10 to be used with pots 12 of varying widths.

The lid 14 includes a series of overlapping leafs 38 disposed annularly about the support structure 14A and hingedly connected thereto. Thus, distal edges 38A of the leafs 38 are adjustable inward and outward to permit using the lid 14 with pots 12 having openings of various diameters. This structure is similar to that used in commonly known steamers which can be inserted into pots of various diameters. Fastening means 40 are disposed substantially evenly about the lid 14 at the distal edges 38A, for fastening the lid 14 to the pot 12. A viewing port 49 in at least one of the leafs 38 permits viewing of the substance in the pot 12 as it is being stirred.

Figure 3:
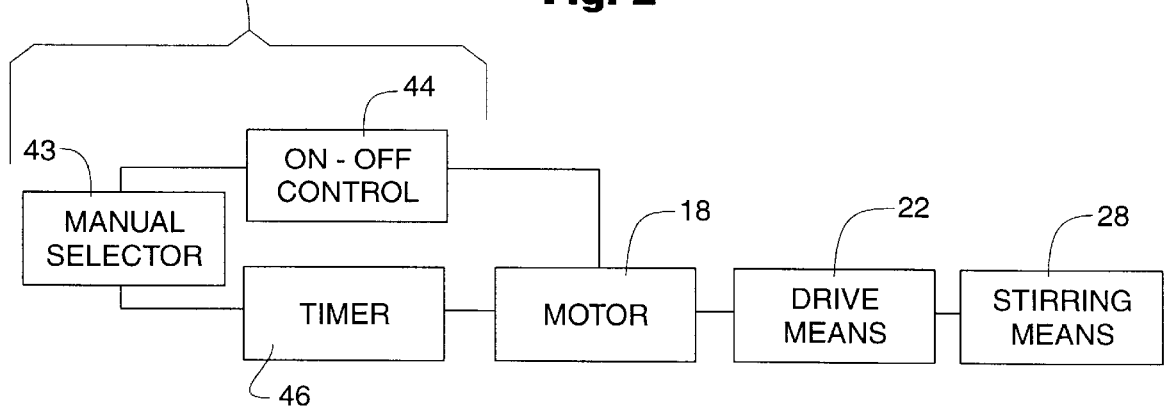
FIG. 3 is a block schematic diagram of the present invention.

FIG. 3 is a block schematic diagram of the present invention. Referring to FIGS. 2 and 3, a control means 42 includes a manual selector 43, a conventional on-off control 44 and a timer 46. The on-off control 44 is used to turn the motor 18 on and off for normal, untimed control of the motor 18. The timer 46 is used to accomplish various timing functions. The on-off control 44, as well as the timing functions accomplished by the timer 46, may be inscribed on the control means 42 as various settings. When the pointer 43A of the manual selector 43 is turned to the appropriate inscription, the specified on-off control or timing function will begin. Timing functions may include constant or intermittent stirring for a pre-determined time period.

Figure 4:
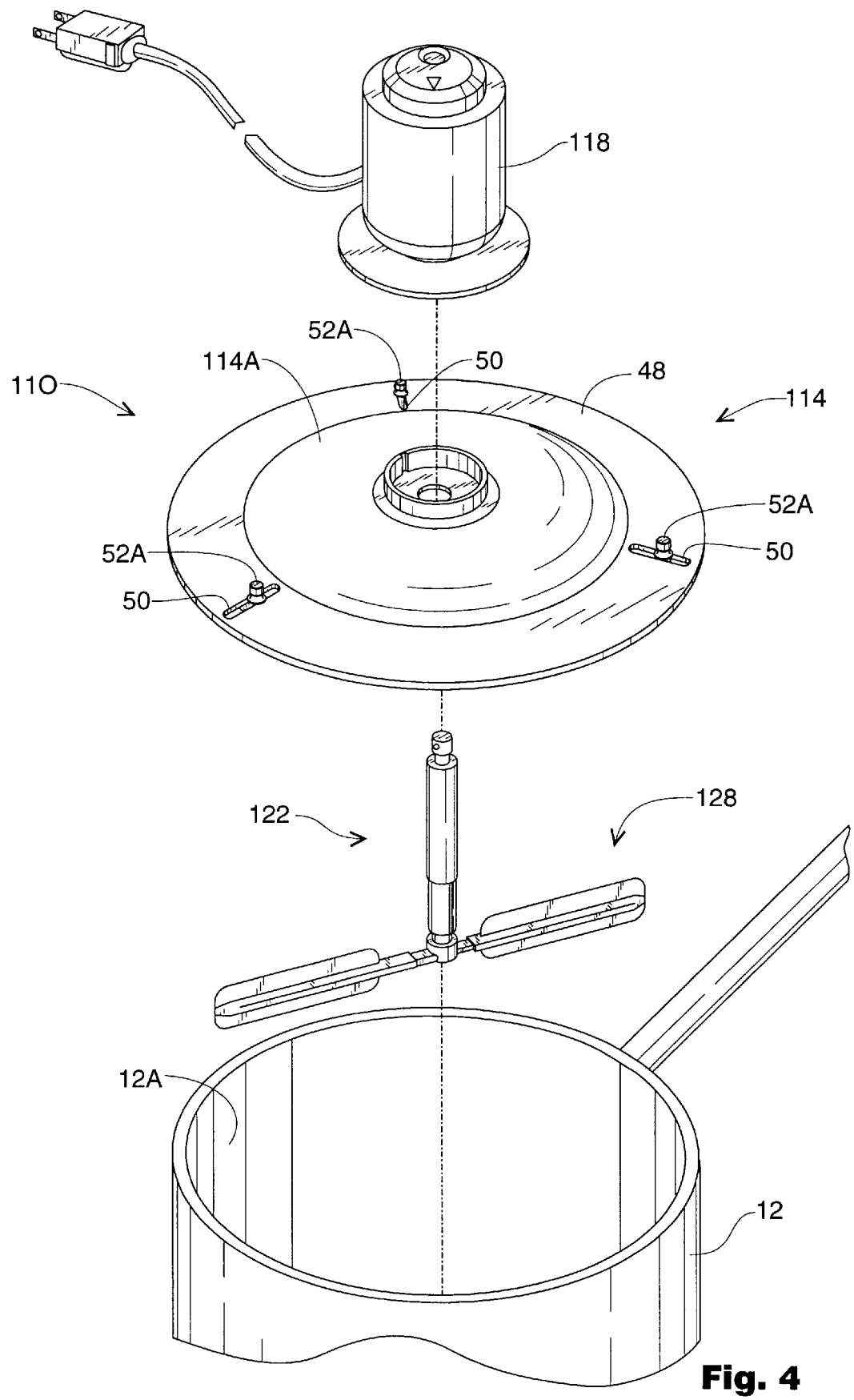
FIG. 4 is an exploded perspective view of a second embodiment of the apparatus.
Figure 5:
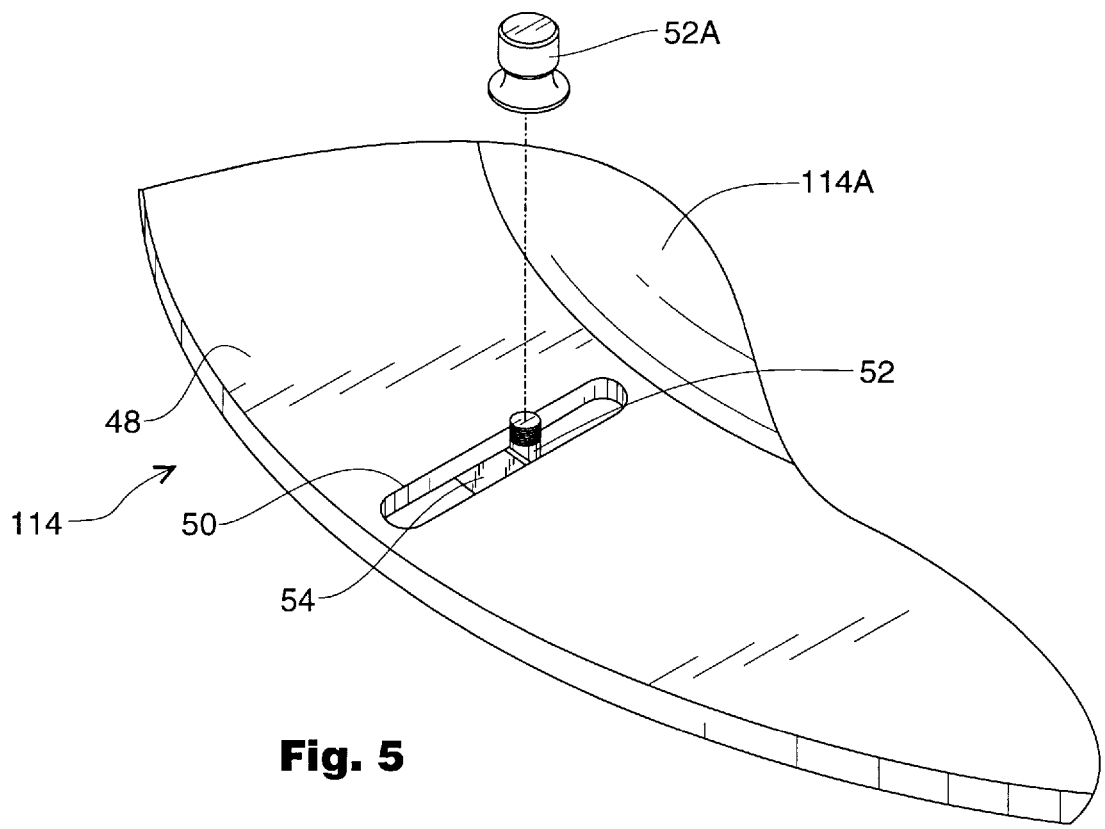
FIG. 5 is a partial perspective view of the second embodiment of the apparatus.
Figure 6:
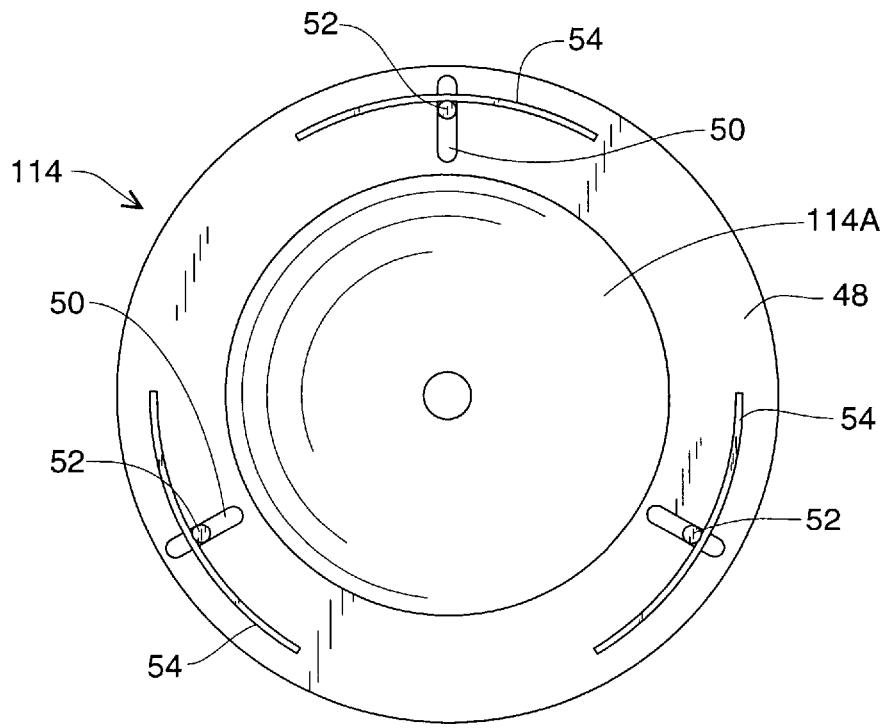
FIG. 6 is a bottom elevational view of a lid of the second embodiment of the apparatus.

FIG. 4 is an exploded perspective view of a second embodiment of the apparatus 110. FIG. 5 is a partial perspective view of the second embodiment of the apparatus 110. FIG. 6 is a bottom elevational view of a lid 114 of the second embodiment of the apparatus 110. Referring to FIGS. 4–6, a motor 118 and a drive means 122 in combination are configured to rotate a stirring means 128 in a manner similar to the first embodiment.

The lid 114 includes a ring shaped member 48 surrounding a support structure 114A. The support structure 114A supports the motor 118 in a similar manner to the first embodiment. A series of radially oriented, elongated slots 50 are disposed near the perimeter of the ring shaped member 48. A threaded post 52 extends through each of the slots 50. Each of the threaded posts 52 is connected to a center of a flexible arcuate member 54, which may be constructed of spring steel or similar material. The arcuate members 54 are positionally adjustable along the slots 50, for engaging an interior surface 12A of the pot 12. Fasteners 52A are provided for securing the threaded post 52 and thus the arcuate member 54 at any position along the elongated slot 50.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. Accordingly, the scope of the invention is to be limited only by the following claims and their legal equivalents.

The invention claimed is:

1. An apparatus for stirring a substance within a pot comprising:
   a. a lid which is adjustable for conformingly fitting over the pot;
   b. a fastening means for attaching the lid to the pot;
   c. a motive means configured to attach to the lid;
   d. a stirring means adapted to be disposed within the pot when the lid is attached to the pot;
   e. a drive means;
   f. the motive means and the drive means in combination configured to rotate the stirring means;
   g. the lid comprising a substantially disk shaped motive means support structure;
   h. an aperture within the motive means support structure, the aperture configured for the drive means to extend there-through; and
   i. a series of overlapping leafs disposed annularly about the support structure and hingedly connected thereto.

2. An apparatus for stirring a substance within a pot comprising:
   a. a lid which is adjustable for conformingly fitting over the pot;
   b. a fastening means for attaching the lid to the pot;
   c. a motive means configured to attach to the lid;
   d. a stirring means adapted to be disposed within the pot when the lid is attached to the pot;
   e. a drive means;
   f. the motive means and the drive means in combination configured to rotate the stirring means;
   g. the lid comprising a motive means support structure;
   h. an aperture within the motive means support structure, the aperture configured for the drive means to extend there-through;
   i. a generally ring shaped member surrounding the support structure;
   j. a series of radially oriented, elongated slots disposed near the perimeter of the generally ring shaped member; and
   k. a plurality of flexible arcuate members, each of the arcuate members being positionally adjustable along one of the slots, for engaging an interior surface of a pot to secure the lid to the pot.

3. The apparatus of claim 2, wherein the stirring means comprises:
   a. a plurality of elongate members extending radially outward from a central member, the central member being connectable to the drive means; and
   b. a plurality of generally paddle shaped structures, each being sleevingly receivable on one of the elongate members.

4. The apparatus of claim 2, wherein the motive means is a motor, and the apparatus further comprises a timer mechanism configured to control the motor to rotate the stirring means for a pre-determined period of time.

5. The apparatus of claim 2, wherein the motive means is a motor, and the apparatus further comprises a timer mechanism configured to control the motor to rotate the stirring means intermittently for a pre-determined period of time.

6. An apparatus for stirring a substance within a pot comprising:
   a. a lid which is adjustable for conformingly fitting over the pot;
   b. a fastening means for attaching the lid to the pot;
   c. a motor configured to attach to the lid;
   d. a stirring means adapted to be disposed within the pot when the lid is attached to the pot;
   e. a drive shaft connected to the motor;
   f. a nested structure comprising:
      i. an elongated sleeve;
      ii. an elongated piston which is slidable within the sleeve, and which includes structure to restrict the piston from rotating relative to the sleeve;
   g. the stirring means being connectable to a first end of the nested structure; and
   h. a second end of the nested structure being connectable to the drive shaft.

* * * * *